United States Patent [19]
Okushiro et al.

[11] Patent Number: 4,831,073
[45] Date of Patent: May 16, 1989

[54] POLYACETAL COMPOSITION AND METHOD OF PREPARATION THEREOF

[75] Inventors: Susumu Okushiro; Eitaro Ikegami, both of Fuji; Seiichi Higashiyama, Fujinomiya; Hiroyuki Miyaji, Fuji, all of Japan

[73] Assignee: Polyplastics Co., Ltd., Osaka, Japan

[21] Appl. No.: 50,608

[22] Filed: May 15, 1987

[30] Foreign Application Priority Data

May 16, 1986 [JP] Japan ................................. 61-112045

[51] Int. Cl.⁴ .......................... C08K 3/26; C08L 59/00
[52] U.S. Cl. .................................... 524/424; 524/417; 524/433; 524/425; 524/593
[58] Field of Search ............... 524/424, 593, 401, 417, 524/430, 433, 425

[56] References Cited

U.S. PATENT DOCUMENTS

| | | | |
|---|---|---|---|
| 3,288,758 | 11/1966 | Letort | 524/593 |
| 4,342,680 | 8/1982 | Sugio | 524/593 |
| 4,506,053 | 3/1985 | Sakurai | 524/593 |
| 4,517,319 | 5/1985 | Reske | 524/424 |
| 4,526,921 | 7/1985 | Sakurai | 524/424 |
| 4,596,847 | 6/1986 | Kasuga | 524/377 |

OTHER PUBLICATIONS

Derwent Abstract, Celanese, 68-14071p/01, Jan. 1968.

Primary Examiner—John C. Bleutge
Assistant Examiner—David Buttner
Attorney, Agent, or Firm—Nixon & Vanderhye

[57] ABSTRACT

A polyacetal resin composition contains 0.1–30% by weight of one or two or more members selected from among carbonaceous materials including carbon black, carbon fiber and graphite and 0.0005–2% by weight of one or two or more members selected from among alkali metal compounds and alkaline earth metal compounds in proportion to the total composition.

7 Claims, No Drawings

POLYACETAL COMPOSITION AND METHOD OF PREPARATION THEREOF

The present invention relates to polyacetal resin compositions containing carbonaceous material(s) such as carbon black, carbon fiber, graphite, etc., and which have excellent thermal stability, moldability and mechanical porperties.

Carbonaceous material(s) such as carbon black, carbon fiber, graphite, etc., have conventionally been mixed with polyacetal resin for the purpose of coloring the resulting composition and for for imparting other physical attributes such as weatherability, conductivity, antistatic property, sliding property, etc., any or improved mechanical strength for the resulting composition. Resin compositions mixed with carbonaceous material(s), because of these properties in addition to the intrinsic balanced properties of polyacetal resins, are becoming more popular for a variety of end uses, such as externally equipped parts, mechanism parts or sliding parts, etc., in the fields of automobile, mechanical and electrical industries, electronic equipment and other industries.

However, the addition of an amount of carbonaceous material(s) large enough to impart the aforementioned desired physical attributes to polyacetal resins not only generally results in a deleterious effect on the thermal stability of the polyacetal resins, (although the extent of the deleterious effect differs with the type, properties and the amount of the added carbonaceous material(s)), but also sometimes causes very serious complications when the compositions are prepared such as decomposition or foaming of resin, when it is melted and kneaded at an extruder, or strand-cut. The thermal stability of the resin compositions obtained are therefore usually affected to an extent that moldability and mechanical properties, etc. are degraded. Especially, when concentrations of carbonaceous material(s) are needed, as when preparing master pellets, etc., this tendency of the resin composition to be degraded is more pronounced.

The present invention relates to polyacetal resin compositions and a stable manufacturing method thereof, which are improved with regard to the aforementioned problems, and which are characterized in that in mixing carbonaceous material(s) such as carbon black, etc., with polyacetal resin, alkali metal compound(s) or alkaline earth metal compound(s) is (are) further added to the mixture, to be in coexistence therewith.

A polyacetal composition of the invention comprises 68 to 99.8995 weight percent of a polyacetal resin, 0.1 to 30 weight percent of a carbon material selected from carbon black, carbon fibers and graphite and 0.0005 to 2 weight percent of a compound of an alkali metal or an alkaline earth metal.

The polyacetal composition of the invention is obtained by blending 0.0005 to 2 weight percent, based on the resulting composition, of a compound of an alkali metal or an alkaline earth metal with a polyacetal and then melting and blending, with 0.1 to 30 weight percent, based on the resulting composition, of a carbon material selected from carbon black, carbon fibers and graphite, the above obtained mixture, before the decomposition of the polyacetal has started.

As the polyacetal resins of this invention, both polyacetal homopolymer and polyacetal copolymers with most of their principal chain consisting of oxymethylene chain are usable. And polyacetals modified by way of bridging or graft-copolymerization by any well-known methods may be used as the substrate resins, with which the effect of this invention can be exhibited. Further, this invention is also effective with the aforementioned polyacetal resins or their modified products which are further supplementarily blended with other organic high molecular materials; e. g., polyurethane resins and fluorine resins; olephinic homopolymers or copolymers such as polyethylene, polypropylene, ethylene-propylene copolymer, ethylene-vinyl-acetate copolymer and ethylene-alkylacrylate copolymer; vinyl compounds and their copolymers such as styrene-butadiene-acrylonitrile copolymer, styrene-acrylonitrile copolymer, etc.; graft-copolymers formed of polyacrylate resins and polymers or their modified products such as polyamide resins, thermoplastic segment type copolyesters, etc.

The carbonaceous materials used according to this invention should be carbon black, carbon fiber, graphite etc., used for the purpose of imparting weatherability and conductivity to polyacetal resins, and for improvement in sliding property and mechanical properties or for coloring, etc., thereof; for example, for the purpose of imparting weatherability or coloring, carbon blacks like furnace black and channel black are suitable and besides, thermal black may be used depending on uses.

For the purpose of imparting conductivity, carbon blacks which have well developed structure, small particle diameter, high porosity and so large surface area, for example, conductive carbon like furnace black or acetylene black, etc., or carbon fiber, are preferable. For simultaneously strengthening the mechanical strengths, carbon fiber is particularly preferable. Further, for improvement in the frictional characteristic and sliding property, graphite, etc., are used.

This invention is effectively applicable with whichever of these carbonaceous materials. With regard to the amount of such a carbonaceous material(s) used, necessary amount for attainment of the desired purpose should be appropriately selected, the preferable range being 0.1-30% by weight of the total composition. If the carbonaceous material addition is smaller than 0.1% by weight, the deleterious effect of the carbonaceous material(s) on the polyacetal resin is relatively small; therefore, the effect of this invention is not as notable and so it is less significant. On the other hand, an amount of carbonaceous material larger than 30% by weight is not desirable, because it becomes necessary to add large amount of alkali metal compound(s) or alkaline earth metal compound(s) for inhibiting of the deleterious effect of the carbonaceous materials, resulting in notable reduction in kneadability of additives into polyacetal resin and extrudability or appearance and other mechanical properties, etc., of the resin compositions obtained. Particularly effective amount of carbonaceous material(s) to be added should be 3-25% by weight, where the addition and joint use of alkali metal compound(s) or alkaline earth metal compound(s) shows particularly distinguished effect, for example, on master pellet compositions for black coloring, conductive compositions, sliding property improving compositions, etc., and in preparing these compositions.

As the alkali metal compounds or alkaline earth metal compounds used according to this invention, carbonates, phosphates, hydroxides and oxides of alkali metals or alkaline earth metals should be preferable; one or two or more members selected from among these groups of compounds may be used. Examples of such compounds include: sodium carbonate, potassium carbonate, calcium carbonate, basic magnesium carbonate, sodium phosphate, potassium phosphate, calcium phosphate, magnesium phosphate, calcium hydroxide, magnesium hydroxide, calcium oxide, etc. Among them, carbonates of alkali metals are preferable.

According to the present inventors' study, the surface of the carbonaceous material is generally acidic and its mixing with polyacetal resin having acetal structure which is weak particularly to acid promotes the latter's decomposition, thereby detracting from thermal stability; therefore, the addition of alkaline material is believed to neutralize the acidity of the carbonaceous material, thereby inhibiting decomposition of resin.

Some materials merely alkaline are not effective; for example, such materials as triethylamine, which have low boiling points, will vaporize away, while preparing the resin composition by extrusion, thus failing to exhibit their adequate effect. And alkaline materials of some types are objectionable, because of accompanying detelterious effects on appearance and mechanical properties, etc., of resin. As testified by the present inventors' experiments, the aforementioned specific alkaline materials, i.e., carbonates, phosphates, hydrates and oxides, etc., of alkali metals or alkaline earth metals, are suitable for the purpose of this invention; they produce quite notable synergistic effect in coexistence with such a carbonaceous material(s) as above-described.

Generally preferable amount of addition of these compounds should be 0.0005–2% by weight of the total composition, although the optimum amount of them to be added is influenced by the property and the amount of addition of the carbonaceous material(s) used. With amounts smaller than 0.0005% by weight, it is almost impossible to obtain the desired effect, but with amounts larger than 2% by weight, unacceptable appearance of resin or marked degradation in mechanical properties, etc., are sometimes brought about. More preferably, their use should be in 0.001–0.3% by weight.

With the polyacetal resin compositions of this invention, mixing and joint use of well-known additives such as anti-oxidants, anti-thermal stabilizers, etc., is preferable.

Illustrated as antioxidants and anti-thermal stabilizers are phenols such as 2,2′-methylene-bis (4-methyl-6-t-butyl phenol), hexamethylene glycolbis(3,5-di-t-butyl-4-hydroxy-hydrocinnamate), tetrakis methylene(3,5-di-t-butyl-4-hydroxyhydrocinnamate) methane, 1,3,5-trimethyl-2, 4, 6-tris(3,5-di-t-butyl-4-hydroxybenzyl) benzene, 4,4′-methylene-bis(2,6-di-t-butyl phenol) and 1,3,5-tris(4-t-butyl-3-hydroxy-2,6-dimethyl benzyl) isocyanurate, and amines such as N-phenyl-N′-isopropyl-p-phenylene diamine, N,N′-diphenyl-p-phenylene diamine, 4,4′-bis(4-α,α-dimethyl benzyl) diphenyl amine, condensation reaction product of diphenyl amine and acetone, N-phenyl-β-naphthyl amine, N,N′-di-β-naphthyl-p-phenylenediamine, etc. And other examples include urea, dicyandiamide, melamine, polyamides, etc. These antioxidants and anti-thermal stabilizers may be used singly or in combination of two or more members of them.

To the compositions of this invention, well-known materials which are generally added to thermoplastic resins and thermosetting resins according to the purposes may be further added for joint use with the additives. They include, for example, organic or inorganic dispersants of various types for aiding the dispersion of carbonaceous material; stabilizers of various types for resistance to light, weathering, etc., besides the aforementioned antioxidants, etc.; lubricants mold releasing agents, plasticisers, nucleating agents, anti-static agents, surface active agents, lubricating oils and greases, etc.; or fibrous, plate shaped, granular or powdery inorganic compounds such as glass fibers, metal fibers, boron fibers, potassium titanate, ceramics, glass flakes, glass beads, mica, talc, highly dispersive silicates, alumina, aluminum hydroxides, qualtz powders, silica sand, wollastonite, various metal powders, metal foils, silicon carbide, boron nitride and silicon nitride, etc.; whiskers and metal wiskers, etc.

The method of preparing compositions of this invention is not particularly limited; any method commonly utilized is usable. In order to stabilize the preparation process and to obtain compositions excellent in thermal stability, moldability, mechanical properties, etc., a method in which an extruder is used and before the molten polyacetal resin and the carbonaceous material(s) have come in contact with each other, thereby initiating the decomposition of resin, alkali metal compound(s) or alkaline earth metal compound(s) are added to be in coexistence therewith, is desirable. For example, a method of simultaneously mixing all components of the composition and then, pelletizing the mixture by way of melting and extruding it, a method of obtaining the pellet of the required composition by way of mixing the components of the composition excluding the carbonaceous material(s), and adding the carbonaceous material(s) at an intermediate position of the extruder, while melting and extruding the mixture, and the like methods are employed.

According to the method of this invention, because alkali metal compound(s) and/or alkaline earth metal compound(s) are (is) always in coexistence with carbonaceous material(s), remarkable improvements have been achieved with regard to various problems of preparation such as foaming, strand-cut, etc., resulting from decomposition of resin and problems of quality like thermal stability, etc., as observed in conventional extrusion process performed in the absence of such alkali metal compounds or alkaline earth metal compounds, enabling high quality compositions to be very stably prepared.

PREFERRED EMBODIMENTS

In the following, this invention will be more particularly described in connection with examples and comparative examples, but it is not restricted thereby.

Major items of evaluation and the methods of evaluation in the following examples and comparative examples are as described hereunder:

CONDITIONS OF EXTRUSION

The conditions of extrusion were observed by conducting the extrusion, using a two-shaft extruder with a 30 mm φ bent (3 die holes).

Strand-cut; expressed by the total number of strands cut during 3 hours' extrusion.

Foaming of resin; Evaluation was made comprehensively in 5 steps by visually observing the foaming state of resin at the bent part, while being extruded, and of the strand and the foaming state and appearance of the pellet obtained.

PROPERTIES

Thermal stability; Loss of weight per 1 min under heating of pellets in air at 230° C. for 45 min (%/min).

Extracted formalin; The amount of formalin extracted by water, when water is added to pellets in a container and boiled for 1.5 hr under reflux.

Tensile elongation; In accordance with the method of ASTM D 638.

MOLDABILITY

Evaluation was made comprehensively in 5 steps in terms of decomposition, foaming and formalin odor of resin at the time of molding and flash marks on test pieces due to generation of gas, etc.

EXAMPLES 1-8 AND COMPARATIVE EXAMPLES 1-3

After mixing with a polyacetal resin (Juracon M90-02 manufactured by Polyplastics Co., Ltd.) furnace black and an alkali metal compound or an alkaline earth metal compound of each composition shown in Table 1, the mixture was melted and kneaded, using a two-shaft extruder with a 30 mmφ bent, while observing the conditions of extrusion, thereby preparing a pellet-form composition. Then the properties of this pellet and the properties of a test piece molded of the pellets by use of an extrusion molder were respectively measured. On the other hand, similar evaluations were also made with those produced as Comparative Examples without addition of such alkali metal compounds or alkaline earth metal compounds. The results of these evaluations are listed in Table-1 together with those of Examples.

TABLE 1

| | Composition | | | | Condition of extrusion | | Properties | | | |
|---|---|---|---|---|---|---|---|---|---|---|
| | Type of carbon black | Concentration (wt %) | Alkali metal compound or alkaline earth metal compound | Concentration (wt %) | Strand-cut (strands/ 3 hr) | Foaming*1 of resin | Thermal stability (%/min) | Extracted formalin (wt %) | Tensile elongation (%) | Moldability*1 |
| Example | | | | | | | | | | |
| 1 | Furnace*2 black | 5.0 | Sodium carbonate | 0.0050 | 0 | ◎ | 0.032 | 0.033 | 12.8 | ◎ |
| 2 | Furnace*2 black | 5.0 | Sodium carbonate | 0.0200 | 1 | ◎ | 0.028 | 0.024 | 12.4 | ◎ |
| 3 | Furnace*2 black | 10.0 | Sodium carbonate | 0.0050 | 1 | ◎ | 0.044 | 0.031 | 5.3 | ◎ |
| 4 | Furnace*2 black | 10.0 | Sodium carbonate | 0.0500 | 0 | ◎ | 0.030 | 0.029 | 5.0 | ◎ |
| 5 | Furnace*2 black | 10.0 | Basic magnesium carbonate | 0.0500 | 2 | ◎ | 0.033 | 0.036 | 5.0 | ◎ |
| 6 | Furnace*2 black | 10.0 | Potassium phosphate | 0.0500 | 5 | ○ | 0.040 | 0.032 | 5.1 | ◎ |
| 7 | Furnace*2 black | 10.0 | Calcium hydroxide | 0.0500 | 4 | ○ | 0.042 | 0.037 | 4.9 | ◎ |
| 8 | Furnace*2 black | 15.0 | Sodium carbonate | 0.1000 | 6 | ○ | 0.057 | 0.034 | 3.8 | ○ |
| Comparative Example | | | | | | | | | | |
| 1 | Furnace*2 black | 5.0 | — | | 13 | ○ | 0.089 | 0.072 | 12.3 | ○ |
| 2 | Furnace*2 black | 10.0 | — | | 60~70 | Δ~x | 0.124 | 0.087 | 4.3 | X |
| 3 | Furnace*2 black | 15.0 | — | | >100 | x~xx | Decomposed*3 | 0.112 | 2.2 | X |

(Notes)
*1Judgment on foaming and moldability of resin --Δ-X-XX Good ⇌ Inferior
*2MCF-88 Manufactured by Mitsubishi Kasei Kogyo K. K.
*3Unmeasurable because the resin was decomposed and foamed.

EXAMPLES 9-15 AND COMPARATIVE EXAMPLES 4-8

Similar tests as those of Examples 1-8 and Comparative Examples 1-3 were conducted with the type of carbonaceous material used varied. The compositions tested and the results of evaluation are listed in Tables 2-5.

TABLE 2

| | Composition | | | | Condition of extrusion | | Properties | | | |
|---|---|---|---|---|---|---|---|---|---|---|
| | Type of carbon black | Concentration (wt %) | Alkali metal compound or alkaline earth metal compound | Concentration (wt %) | Strand-cut (strands/ 3 hr) | Foaming*1 of resin | Thermal stability (%/min) | Extracted formalin (wt %) | Tensile elongation (%) | Moldability*1 |
| Example | | | | | | | | | | |
| 9 | Conductive*2 furnace black | 5.0 | Sodium carbonate | 0.100 | 2 | ○ | 0.033 | 0.027 | 9.5 | ◎ |
| 10 | Conductive*2 furnace black | 5.0 | Basic magnesium carbonate | 0.100 | 4 | ○ | 0.048 | 0.041 | 9.2 | ○ |
| 11 | Conductive*2 furnace black | 10.0 | Sodium carbonate | 0.100 | 5 | ○ | 0.042 | 0.028 | 4.3 | ○ |
| 12 | Conductive*2 furnace black | 10.0 | Calcium | 0.100 | 13 | Δ | 0.065 | 0.036 | 3.8 | ○ |

TABLE 2-continued

| | Composition | | | | Condition of extrusion | | Properties | | | |
|---|---|---|---|---|---|---|---|---|---|---|
| | Type of carbon black | Concentration (wt %) | Alkali metal compound or alkaline earth metal compound | Concentration (wt %) | Strand-cut (strands/ 3 hr) | Foaming*1 of resin | Thermal stability (%/min) | Extracted formalin (wt %) | Tensile elongation (%) | Moldability*1 |
| | furnace black | | oxide | | | | | | | |
| Comparative Example 4 | Conductive*2 furnace black | 5.0 | — | | >100 | xx | Decomposed*3 | 0.093 | 6.8 | x |
| | Conductive*2 furnace black | 10.0 | — | | Strand undrawable | xx | Decomposed*3 | 0.128 | 0.8 | xx |

(Notes)
*1In accordance with the same score standard as in Table 1.
*2Ketchen Black EC manufactured by LION AKZO Co., Ltd.
*3Unmeasurable because the resin was decomposed and foamed.

TABLE 3

| | Composition | | | | Condition of extrusion | | Properties | | | |
|---|---|---|---|---|---|---|---|---|---|---|
| | Type of carbon black | Concentration (wt %) | Alkali metal compound or alkaline earth metal compound | Concentration (wt %) | Strand-cut (strands/ 3 hr) | Foaming*1 of resin | Thermal stability (%/min) | Extracted formalin (wt %) | Tensile elongation (%) | Moldability*1 |
| Example 13 | Acetylene*2 black | 10.0 | Sodium carbonate | 0.0050 | 0 | ◉ | 0.021 | 0.018 | 5.2 | ◉ |
| Comparative Example 6 | Acetylene*2 black | 10.0 | — | | 3 | ○ | 0.048 | 0.028 | 5.3 | ○ |

(Notes)
*1In accordance with the score standard as in Table 1.
*2Denka Acetylene Black Manufactured by Denki Kagaku Kogyo K. K.

TABLE 4

| | Composition | | | | Condition of extrusion | | Properties | | | |
|---|---|---|---|---|---|---|---|---|---|---|
| | Type of carbon black | Concentration (wt %) | Alkali metal compound or alkaline earth metal compound | Concentration (wt %) | Strand-cut (strands/ 3 hr) | Foaming*1 of resin | Thermal stability (%/min) | Extracted formalin (%) | Tensile elongation (%) | Moldability*1 |
| Example 14 | Graphite*2 | 10.0 | Sodium carbonate | 0.0050 | 0 | ◉ | 0.015 | 0.021 | 5.4 | ◉ |
| Comparative Example 7 | Graphite*2 | 10.0 | — | | 3 | ○ | 0.035 | 0.037 | 5.1 | ○ |

(Notes)
*1In accordance with the score standard as in Table 1.
*2Graphite ASSP manufactured by Nihon Kokuen Kogyo K. K.

TABLE 5

| | Composition | | | | Condition of extrusion | | Properties | | | |
|---|---|---|---|---|---|---|---|---|---|---|
| | Type of carbon black | Concentration (wt %) | Alkali metal compound or alkaline earth metal compound | Concentration (wt %) | Strand-cut (strands/ 3 hr) | Foaming*1 of resin | Thermal stability (%/min) | Extracted formalin (%) | Tensile elongation (%) | Moldability*1 |
| Example 15 | Carbon*2 fiber | 20.0 | Sodium carbonate | 0.200 | 10~15 | ○ | 0.034 | 0.036 | 3.6 | ○ |
| Comparative Example 8 | Carbon*2 fiber | 20.0 | — | | 60~80 | Δ | 0.087 | 0.069 | 3.0 | Δ |

(Notes)
*1In accordance with the score standard as in Table 1.
*2Carbon fiber chop (surface treated product) manufactured by Kureha Kagaku K. K.

The effects of this invention are as clarified in the foregoing description and in connection with its preferred embodiments. Thus by further adding alkali metal compound(s) and/or alkaline earth metal compound(s) to polyacetal resin, when mixed with carbonaceous material(s), to be in coexistence with the mixture, various problems like decomposition and foaming of resin, strand-cut, etc., at the time of preparation of the resin composition by melting and kneading have been solved, thus not only assuring stability in manufacturing the compositions, but enabling production of carbonaceous material containing polyacetal resin compositions excellent in thermal stability, moldability and mechanical properties, as compared with the conventional method in which their preparation is made without the coexistence of such alkali metal compounds or alkaline earth metal compounds.

What is claimed is:

1. A polyacetal resin composition comprising between 68 to 99.8995 weight percent of a polyacetal resin, between 0.1 to 30 weight percent of a carbon material which is at least one selected from the group consisting of carbon black, carbon fibers and graphite, and between 0.0005 to 2 weight percent of a thermal stabilizing agent which is at least one selected from the group consisting of alkali metal carbonates and alkaline earth metal carbonates.

2. A polyacetal resin composition as in claim 1, wherein the thermal stabilizing agent is selected from the group consisting of sodium carbonate, magnesium carbonate, potassium carbonate and calcium carbonate.

3. A polyacetal resin composition as in claim 1, wherein said thermal stabilizing agent is sodium carbonate or magnesium carbonate.

4. A polyacetal resin composition as in claim 1, wherein said thermal stabilizing agent is present in an amount between 0.001 to 0.3 weight percent.

5. A polyacetal resin composition as in claim 4, wherein said carbon material is present in an amount between 3 to 25 weight percent.

6. A method for preparing a polyacetal composition comprising the steps of preblending a polyacetal resin with between 0.0005 to 2 weight percent, based upon the weight of the final polyacetal composition, of a thermal stabilizing agent which is at least one selected from the group consisting of alkali metal carbonates and alkaline earth metal carbonates, and then subsequently blending between 0.1 to 30 weight percent, based upon the weight of the final polyacetal composition, a carbon material which is at least one selected from the group consisting of carbon black, carbon fibers and graphite, with the preblended polyacetal resin and thermal stabilizing agent, whereby decomposition of the polyacetal resin is prevented.

7. A polyacetal resin composition consisting essentially of (a) between 68 to 99.8995 weight percent of a polyacetal resin, (b) between 0.1 to 30 weight percent of a carbon material which is at least one selected from the group consisting of carbon black, carbon fibers and graphite, and (c) between 0.0005 to 0.2 weight percent of a thermal stablizing agent for said composition which is selected from the group consisting of sodium carbonate and magnesium carbonate.

* * * * *

UNITED STATES PATENT AND TRADEMARK OFFICE
CERTIFICATE OF CORRECTION

PATENT NO. : 4,831,073

DATED : May 16, 1989

INVENTOR(S) : OKUSHIRO et al

It is certified that error appears in the above-identified patent and that said Letters Patent is hereby corrected as shown below:

```
Column 1, line 13, delete "for" (second occurrence);
          line 15, after "etc.," delete "any";
          line 34, after "of" insert --the--.

Column 2, line 36, after "with" delete "which";
          line 37, delete "ever".

Column 3, line 37, after "of" insert --the--.

Column 4, line 3, change "plasticisers" to --plasticizers--.
```

Signed and Sealed this

Third Day of April, 1990

Attest:

HARRY F. MANBECK, JR.

*Attesting Officer*       *Commissioner of Patents and Trademarks*